US011295493B2

(12) United States Patent
Sanghai et al.

(10) Patent No.: US 11,295,493 B2
(45) Date of Patent: Apr. 5, 2022

(54) SYSTEM AND METHOD FOR GENERATING SCALAR VECTOR GRAPHICS IMAGE IN AN IMAGINARY CONSOLE

(71) Applicant: Intellicus Technologies Pvt. Ltd., Indore (IN)

(72) Inventors: Anurag Sanghai, Indore (IN); Hemendra Vyas, Indore (IN); Pratik Jain, Indore (IN)

(73) Assignee: Intellicus Technologies Pvt. Ltd.

( * ) Notice: Subject to any disclaimer, the term of this patent is extended or adjusted under 35 U.S.C. 154(b) by 216 days.

(21) Appl. No.: 15/294,265

(22) Filed: Oct. 14, 2016

(65) Prior Publication Data
US 2017/0109325 A1 Apr. 20, 2017

(30) Foreign Application Priority Data
Oct. 15, 2015 (IN) .......................... 3915/MUM/2015

(51) Int. Cl.
*G06F 17/21* (2006.01)
*G06T 11/60* (2006.01)
*G06T 11/20* (2006.01)
*G06F 16/904* (2019.01)

(52) U.S. Cl.
CPC ............ *G06T 11/60* (2013.01); *G06F 16/904* (2019.01); *G06T 11/206* (2013.01)

(58) Field of Classification Search
CPC .... G06F 17/211; G06F 17/2247; G06T 11/60; G06T 11/206
See application file for complete search history.

(56) References Cited

U.S. PATENT DOCUMENTS

| 7,451,069 B2 | 11/2008 | Moosburger et al. |
| 7,453,472 B2 | 11/2008 | Goede et al. |
| 8,291,309 B2 | 10/2012 | Callaghan et al. |
| 8,451,275 B2 * | 5/2013 | Lee .......................... G06T 13/00 345/473 |

(Continued)

FOREIGN PATENT DOCUMENTS

WO   WO2008052283 A1   5/2008

OTHER PUBLICATIONS

JavaScript Graphics Library (JSGL) Website, 2014, JSGL.org, Home Page (Year: 2014).*
EMC®, VNX® "Monitoring and Reporting", Oct. 2013, pp. 62.

*Primary Examiner* — Maikhanh Nguyen
(74) *Attorney, Agent, or Firm* — HM Law Group LLP; Vani Moodley, Esq.

(57) ABSTRACT

The present subject matter discloses system and method for generating a scalar vector graphics (SVG) image in an imaginary console. The system receives one or more image parameters, corresponding to the image, from the user. Further, the imaginary console emulates a browser environment by using a JavaScript Engine and a browser emulator. The SVG executer processes the one or more image parameters corresponding to the image to render the image on the imaginary console, and produces the image having SVG format. Further, the document generator module may convert the image having the SVG format into the raster image based on report format specified by the user. Further, the document generator module embeds the image into the offline readable format to be used by the user.

11 Claims, 4 Drawing Sheets

(56) References Cited

U.S. PATENT DOCUMENTS

| | | | |
|---|---|---|---|
| 9,041,729 B1* | 5/2015 | Stahl | G06F 3/0484 345/619 |
| 9,430,195 B1* | 8/2016 | Pecoraro | G06F 3/04845 |
| 10,008,009 B1* | 6/2018 | Pecoraro | G06F 8/40 |
| 10,380,721 B2* | 8/2019 | Agrawal | G06T 5/003 |
| 10,922,859 B2* | 2/2021 | Biswas | G06T 17/005 |
| 2004/0111672 A1* | 6/2004 | Bowman | G06F 9/451 715/234 |
| 2007/0071337 A1* | 3/2007 | Thomas | H04N 19/176 382/240 |
| 2007/0118821 A1* | 5/2007 | Yee | G06T 11/206 715/864 |
| 2007/0198653 A1 | 8/2007 | Jarnagin et al. | |
| 2007/0198918 A1* | 8/2007 | Mor | G06F 16/972 715/234 |
| 2008/0082907 A1* | 4/2008 | Sorotokin | G06F 40/106 715/210 |
| 2008/0094401 A1* | 4/2008 | Lee | G06T 13/00 345/473 |
| 2008/0127062 A1* | 5/2008 | Kim | G06T 11/60 717/106 |
| 2010/0172594 A1* | 7/2010 | Priddle | G06T 11/00 382/253 |
| 2011/0145694 A1* | 6/2011 | Graves | G06F 16/9577 715/234 |
| 2013/0107327 A1* | 5/2013 | Ko | H04N 1/3263 358/450 |
| 2013/0132907 A1* | 5/2013 | Kukulski | G06T 3/4092 715/838 |
| 2013/0335452 A1* | 12/2013 | Suchomel | G06T 11/203 345/660 |
| 2014/0040070 A1* | 2/2014 | Pereymer | G06Q 30/0633 705/26.8 |
| 2014/0198111 A1* | 7/2014 | Wills | G06T 3/00 345/522 |
| 2015/0095763 A1* | 4/2015 | Wang | G06F 9/455 715/234 |
| 2015/0271218 A1* | 9/2015 | Steingrimsson | G06Q 10/101 709/204 |
| 2016/0274767 A1* | 9/2016 | Gupta | G06F 3/04845 |
| 2017/0017430 A1* | 1/2017 | Mukasa | G06F 3/1274 |

* cited by examiner

SYSTEM AND METHOD FOR GENERATING SCALAR VECTOR GRAPHICS IMAGE IN AN IMAGINARY CONSOLE

PRIORITY INFORMATION

The patent application takes priority from an Indian provisional application (3915/MUM/2015) filed on Oct. 15, 2015, the entirety of which is hereby incorporated by reference.

TECHNICAL FIELD

The present subject matter described herein, in general, relates to a field of image processing, and more particularly to, a system and a method for scalar vector graphics (SVG) image processing.

BACKGROUND

Typically, there are two different methods for representing images in digital format. These methods are vector graphics and bitmaps graphics. In the bitmap graphics, the images are formed by collection of pixels arranged in a pattern. These pixels can be seen by a naked eye when the image is zoomed. However, if the image (in the bitmap format) is scaled up/enlarged beyond a certain limit, the image gets pixilated and appears as unnatural and blurred. In order to overcome the pixilation issue of bitmap images the vector graphics method is used. The vector graphics method is not based on pixel pattern, but instead, the vector graphics method uses mathematical formula(s) to draw lines and curves that can be combined to create the image i.e., a vector image. Unlike the bitmap image, the vector image never gets blurred even if it is scaled up or enlarged. The vector image is redrawn using the mathematical formula(s) resulting in the vector image being zoomed/enlarged as smooth as the original image.

Based on the vector graphics method, an extensive markup language (XML) based language called as scalar vector graphics (SVG) may be used to generate vector images. The SVG describes and defines vector based graphics in XML format for displaying the vector images also referred as "scalar vector graphics image" i.e., SVG image on a web. Due to its ability of presenting fully scalable images even in case of zooming and panning, the SVG images are used in business analytic tools. The business analytic tools usually generate reports pertaining to business intelligence. The reports generated include various charts, graphs and other type of graphical elements which makes the report more informative and attractive for users. The said charts, graphs and the graphical elements are represented in a form of SVG images.

Typically, the business analytic tools are developed based upon JAVA libraries that are operated in an online environment. In other words, the JAVA libraries developing the business analytical tools require browser and computer-console for generating the reports. But, many a times it has been experienced that the users requires these reports (having charts and graphs) in an offline mode i.e., in an offline readable format such as PDF, DOC, XLS, PPT and the like. To make it available in the offline environment, the report (having the charts and graphs) is first converted into a portable graphical format so that images could be embedded into offline readable documents like PDF or WORD DOCUMENT. To address this requirement, the business analytic tools generally provide "export button" option for exporting the report in a preferred format. However, the charts and the graphs displayed after exporting the report are inconsistent with original charts and graphs displayed in the online environment.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for embedding a Scalar Vector Graphics (SVG) image in a report and the concepts are further described below in the detailed description. This summary is not intended to identify essential features of the claimed subject matter nor is it intended for use in determining or limiting the scope of the claimed subject matter.

In one implementation, a method for generating a Scalar Vector Graphics (SVG) image in an imaginary console and thereby embedding the generated SVG image in a report is disclosed. In order to embed a Scalar Vector Graphics (SVG) image in a report, initially, one or more image parameters may be received to generate the image, having a SVG format, to be embedded in the report. After receiving the one or more image parameters, an imaginary console may be created by using a JavaScript Engine and a JavaScript environment. In one aspect, the imaginary console may indicate an emulated browser environment. Upon creating the imaginary console, the image, having the SVG format, may be generated on the imaginary console upon processing the one or more image parameters. In one aspect, the one or more image parameters may be processed by using Java Script Graphics Libraries (JSGL). Subsequent to the generation of the image, the image may be embedded into the report. In one aspect, the aforementioned method for embedding the SVG image in the report may be performed by a processor using programmed instructions stored in a memory.

In one implementation, a system for generating a Scalar Vector Graphics (SVG) image in an imaginary console and thereby embedding the generated SVG image in a report is disclosed. The system may comprise a processor and a memory coupled to the processor. The processor may execute a plurality of modules present in the memory. The plurality of modules may comprise a data capturing module, an imaginary console module, a SVG executer module, and a document generator module. The data capturing module may receive one or more image parameters for generating an image, having a SVG format, to be embedded in the report. The imaginary console module may create an imaginary console by using a JavaScript Engine and a JavaScript environment. In one aspect, the imaginary console may indicate an emulated browser environment. Upon creation of the imaginary console, the SVG executer module may further generate the image, having the SVG format, on the imaginary console upon processing the one or more image parameters. In one aspect, the one or more image parameters may be processed by using Java Script Graphics Libraries (JSGL). After generation of the image, the document generator module may embed the image into the report.

In yet another implementation, non-transitory computer readable medium embodying a program executable in a computing device for generating a Scalar Vector Graphics (SVG) image in an imaginary console and thereby embedding the generated SVG image in a report is disclosed. The program may comprise a program code for receiving one or more image parameters for generation of an image, having a SVG format, to be embedded into the report. The program may further comprise a program code for creating an imaginary console using a JavaScript Engine and a JavaScript environment. In one aspect, the imaginary console may indicate an emulated browser environment. The program may further comprise a program code for generating the image, having the SVG format, on the imaginary console upon processing the one or more image parameters. In one aspect, the one or more image parameters may be processed by using Java Script Graphics Libraries (JSGL). The program may further comprise a program code for embedding the image into the report.

BRIEF DESCRIPTION OF THE DRAWINGS

The foregoing detailed description of embodiments is better understood when read in conjunction with the appended drawings. For the purpose of illustrating the disclosure, example constructions of the disclosure is shown in the present document; however, the disclosure is not limited to the specific methods and systems disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

According to various aspects of present disclosure, a system and method for generating a Scalar Vector Graphics (SVG) image in an imaginary console and thereby embedding the generated SVG image in a report (hereinafter also interchangeably referred to as an offline readable document) is disclosed. It may be understood that the SVG image may be embedded by converting the SVG image into one of a portable image formats (hereinafter also interchangeably referred to as a raster image format) such as Portable Network Graphics (PNG). According to one embodiment, the SVG image may be found in reports, generated by business analytic tools, in order to illustrate quantitative data. For example, the quantitative data illustrated by the SVG image may adopt at least one of a representation medium including, but not limited to, a chart, a graph, and a map. Since, these business analytic tools works in an online environment, it becomes cumbersome for the users to generate the reports in an offline environment.

In order to overcome the issues of generating reports in offline mode, the system enables the business analytic tools to generate an offline readable document with one or more portable images without using a web browser and a computer-console. The portable image may correspond to SVG image or SVG images converted into portable image formats such as the PNG. When the request is received to deliver high definition chart in the offline readable document, the system executes a computer program comprising a data capturing module, an imaginary console module, a raster conversion module, and a document generator module. For generating the offline readable document, initially, one or more image parameters comprising a type of the image and values, based on which the image is to be generated, may be received. Further the system may create an imaginary console by using a JavaScript Engine and a JavaScript environment. The imaginary console may indicate an emulated browser environment.

Subsequently, the SVG executer utilizes JavaScript graphics libraries (JSGL) for rendering the scalar vector graphics on the imaginary console. The JSGL is an open source library of two-dimensional vector graphics for JavaScript. On the imaginary console, the image, having the SVG format, may be generated upon processing the one or more image parameters. Subsequently, the system captures the image rendered by the imaginary console and embeds the image in the report. In one embodiment, the image may be embedded when the format of the report is compatible with the SVG format. In another embodiment, when the format of the report is not compatible with the SVG format, the system converts the image into the raster format. The conversion of the image having the SVG format may be achieved by taking height and width dimensions of the required image (i.e., the portable image), and then rendering the scalar vector graphics in that dimension in order to generate the portable image. Once the portable image is generated, the portable image may be embedded into the offline readable document.

Figure 1:
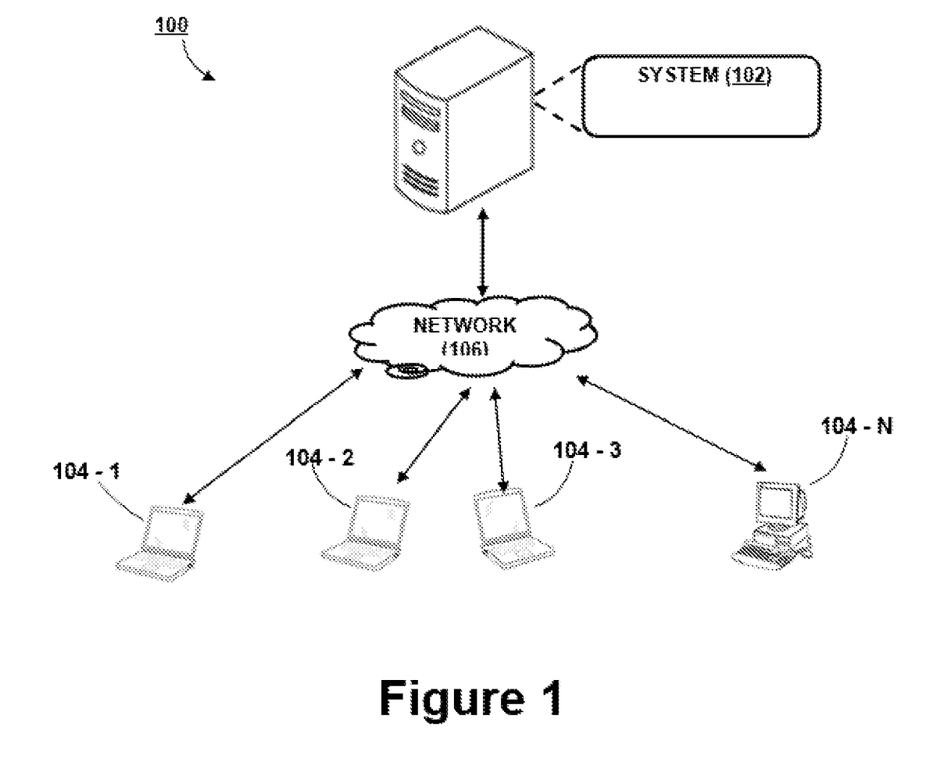
FIG. 1 illustrates a network implementation of a system for generating a Scalar Vector Graphics (SVG) image in an imaginary console and thereby embedding the generated SVG image in a report, in accordance with an embodiment of the present subject matter.

Referring to FIG. 1, a network implementation 100 of a system 102 for generating a Scalar Vector Graphics (SVG) image in an imaginary console and thereby embedding the generated SVG image in a report is illustrated, in accordance with an embodiment of the present subject matter. According to embodiments of present disclosure, the system 102 may be implemented as a reporting server coupled with a business analytic tool for generating reports. In order to embed the SVG image in the report, initially, the system 102 may receive one or more image parameters to generate an image, having a SVG format, to be embedded in the report. After receiving the one or more image parameters, the system 102 creates an imaginary console by using a JavaScript Engine and a JavaScript environment. In one aspect, the imaginary console may indicate an emulated browser environment. Upon creating the imaginary console, the system 102 generates the image, having the SVG format, on the imaginary console upon processing the one or more image parameters. In one aspect, the one or more image parameters may be processed by using Java Script Graphics Libraries (JSGL). Subsequent to the generation of the image, the system 102 may embed the image into the report.

Although the present disclosure is explained considering that the system 102 is implemented on a server, it may be understood that the system 102 may be implemented in a variety of computing systems, such as a laptop computer, a desktop computer, a notebook, a workstation, a mainframe computer, a server, a network server, a cloud-based computing environment. It will be understood that the system 102 may be accessed by multiple users through one or more user devices 104-1, 104-2 . . . 104-N, collectively referred to as user 104 or stakeholders, hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
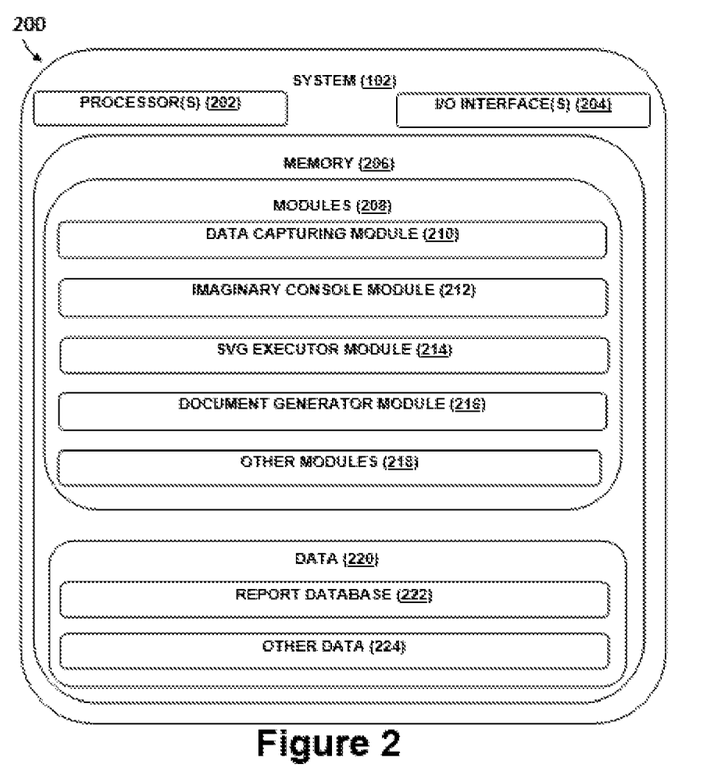
FIG. 2 illustrates architecture diagram of the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions or modules stored in the memory 206.

The I/O interface 204 may include a variety of software and hardware interfaces, for example, a web interface, a graphical user interface, and the like. The I/O interface 204 may allow the system 102 to interact with a user. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes. The memory 206 may include modules 208 and data 220.

The modules 208 include routines, programs, objects, components, data structures, etc., which perform particular tasks or implement particular abstract data types. In one implementation, the modules 208 may include the data capturing module 210, the imaginary console module 212, a SVG executer module 214, the document generator module 216, and other modules 218. The other modules 218 may include programs or coded instructions that supplement applications and functions of the system 102.

The data 220, amongst other things, serves as a repository for storing data processed, received, and generated by one or more of the modules 208. The data 220 may also include report database 222 and other data 224.

Figure 3:
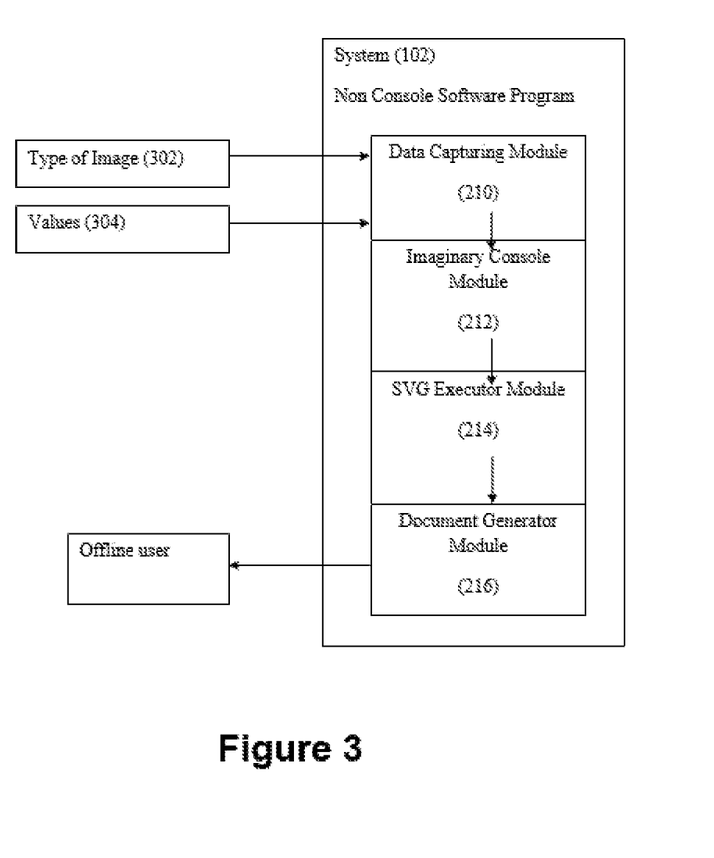
FIG. 3 illustrates detail working of the system, in accordance with an embodiment of the present subject matter.

Referring now to FIG. 3 illustrates detail working of the system 102, in accordance with an embodiment of the present subject matter. The system 102 may be implemented as a reporting server coupled with business analytic tool. In order to obtain a SVG image embedded into a report, at first, a user may use the client device 104 to access the system 102 via the I/O interface 204. The user may register them using the I/O interface 204 in order to use the system 102. In one aspect, the user may access system 102 using the I/O interface 204 of the system 102. Further, the user may provide one or more image parameters, to the system 102, for generating the SVG image.

Further, the data capturing module 210 is configured to receive the one or more image parameters specified by the user for generating the image. Further, the one or more image parameters may comprise the type of image 302 and values 304. The type of image 302 may be one of a chart, a graph, a map, and the like. In one aspect, the chart may be one of pie chart, radar chart, doughnut chart, and alike. In another aspect, the graph may be one of bar graph, in graph, column graph, scatter graph, and alike. Further, values 304 may correspond to a data set generated by the business analytic tool.

Upon receiving the one or more image parameters, the imaginary console module 212 may create an imaginary console, by using a JavaScript Engine (Rhino) and a JavaScript environment. The imaginary console may act as a virtual emulated environment similar to a web browser.

In one embodiment, a web page of the web browser may comprise of a collection of HTML elements to be displayed in the web browser. The web browser is configured to create a Document Object Model (DOM) corresponding to the web page, wherein each HTML element in the web page may be defined as a DOM object. The DOM object may access and configure all the methods and properties of the HTML elements of the web page. The web browser has an in-built JavaScript engine to execute the JavaScript codes which may manage the DOM objects.

In one embodiment, the imaginary console corresponds to a program written in JavaScript language. The program code may enable APIs to create a webpage and manipulate the DOM of its HTML elements similar to the JavaScript engine of the web browser. The imaginary console is configured to simulate all the required functionality of the web browser for creating, accessing and configuring the HTML element. The APIs of the imaginary console accepts the request from the user and responds in a similar manner as the web browser.

Further, the SVG executer module 214 may generate the image with the SVG format, on the imaginary console, based upon the one or more image parameters. Further, the one or more image parameters may be processed by using Java Script Graphics Libraries (JSGL). The JSGL may process the one or more image parameters and perform calculations to relate, compare the one or more image parameters and create multiple image elements. The image elements are similar to the DOM objects and the web browser is needed to process and draw the HTML element out of the DOM object. Using the imaginary console the DOM manipulation may be processed for generating the image using the one or more image parameters.

Once the image is generated on the imaginary console, the document generator module 216 may generate a report comprising the image. The format of the image may be determined based on the report format specified by the user. In one embodiment, if the report format specified by the user supports SVG images, then the image having the SVG format may be directly embedded into the report. Further, the report may be downloaded by the user of the system 102 and used in an offline environment.

In one embodiment, if report format specified by the user is DOC, PPT, and XLS which do not support SVG images, then the document generator module 216 may convert the image having SVG format into an image having a raster image format using raster conversion techniques available in the art. In one aspect, the raster image format may be one of a JPEG, a BITMAP, a PNG, a JPG, and the like. In another embodiment, once the image in raster image format is generated, the document generator module 216 may embed the image having the raster image format into the report.

In one embodiment, the document generator module 216 may schedule reception of the report through email. In one embodiment, the user may also download the report using an export button. The export button may be provided at the user side to avail the report embedded with the image.

Figure 4:
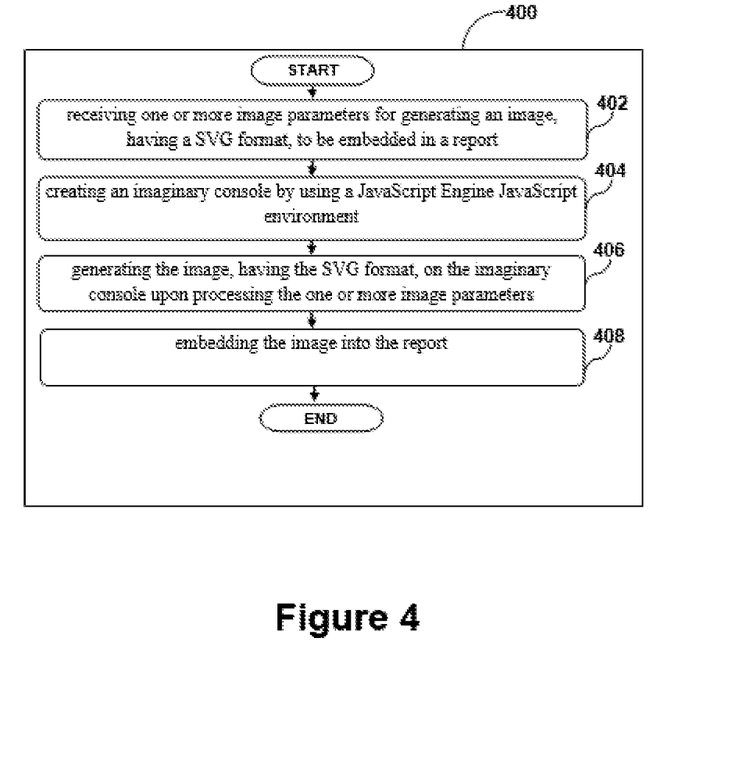
FIG. 4 illustrates a method for generating a Scalar Vector Graphics (SVG) image in an imaginary console and thereby embedding the generated SVG image in a report, in accordance with an embodiment of the present disclosure.

Referring now to FIG. 4, a method 400 for generating a Scalar Vector Graphics (SVG) image in an imaginary console and thereby embedding the generated SVG image in a report, is disclosed in accordance with an embodiment of the present subject matter. The method 400 may be described in the general context of computer executable instructions. Generally, computer executable instructions can include routines, programs, objects, components, data structures, procedures, modules, functions, and the like, that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented in the above described system 102.

At block 402, the data capturing module 210 of the system 102 is configured to receive the one or more image parameters specified by the user for generating the image. Further, the one or more image parameters may comprise the type of image 302 and values 304. The type of image 302 may be one of a chart, a graph, a map, and the like. In one aspect, the chart may be one of pie chart, radar chart, doughnut chart, and alike. In another aspect, the graph may be one of bar graph, in graph, column graph, scatter graph, and alike. Further the values 304 may correspond to a data set generated by the business analytic tool.

At block 404, upon receiving the one or more image parameters, the imaginary console module 212 may create an imaginary console by using a JavaScript Engine (Rhino) and a JavaScript environment. In one aspect, the imaginary console may indicate an emulated browser environment which simulates Document Object Modeling (DOM) manipulations in memory 206. The imaginary console may act as a virtual browser and provide browser like environment for running java script and facilitates the generation of the SVG image based on the one or more image parameters.

At block 406, the SVG executer module 214 may generate the image with the SVG format, on the imaginary console, based upon the one or more image parameters. Further, the one or more image parameters may be processed by using Java Script Graphics Libraries (JSGL). The SVG executor module 214 may also process the one or more image parameters and command the JSGL to render the image on the imaginary console.

At block 408, once the image is generated on the imaginary console, the document generator module 216 may generate a report comprising the image. The format of the image may be determined based on the report format specified by the user. In one embodiment, if the report format specified by the user supports SVG images, then the document generator module 216 may convert the image having SVG format into an image having a raster image format using raster conversion techniques available in the art. In one aspect, the raster image format may be one of a JPEG, a BITMAP, a PNG, a JPG, and the like. In another embodiment, once the image in raster image format is generated, the document generator module 216 may embed the image having the raster image format into the report. Further, the report may be downloaded by the user of the system 102 and used in an offline environment.

In one embodiment, the document generator module 216 may schedule reception of the report through email. In one embodiment, the user may also download the report using an export button. The export button may be provided at the user side to avail the report embedded with the image.

Although implementations for methods and systems for generating a Scalar Vector Graphics (SVG) image in an imaginary console and thereby embedding the generated SVG image in a report have been described, it is to be understood that the appended claims are not necessarily limited to the specific features or methods described. Rather, the specific features and methods are disclosed as examples of implementations for generating a Scalar Vector Graphics (SVG) image.

We claim:

1. A method for rendering and embedding a Scalable Vector Graphics (SVG) image in an offline readable document, the method comprising:
  receiving, by a processor, one or more image parameters comprising a type of an image and values corresponding to each parameter for rendering an image having a Scalable Vector Graphics (SVG) format, wherein the values are received inside a business analytical tool;
  creating, by the processor, an imaginary console by using a Script Engine and a Script environment, wherein the imaginary console indicates an emulated browser environment in a non-networked computer software program without a web browser and a computer console program, and wherein the imaginary console is configured to simulate functionalities of a web browser for rendering, accessing, and configuring image elements corresponding to the one or more image parameters in a non-network mode;
  rendering, by the processor, the image having the SVG format on the imaginary console upon processing the one or more image parameters, wherein the one or more image parameters are processed by using Script Graphics Libraries (SGL), and wherein the SGL perform calculations to relate, compare the one or more image parameters, create multiple image elements, and render the image with the SVG format, the one or more image parameters, and the values;
  converting, by the processor, the image having the SVG format into a raster image when the format of an offline readable document is an SVG incompatible format; and
  embedding, by the processor, the image into the offline readable document.

2. The method of claim 1, wherein the image is at least one of a chart, a graph, and a map.

3. The method of claim 1, wherein the raster image format is at least one of a JPEG, a BITMAP, a PNG, and a JPG.

4. The method of claim 1, wherein the image having the SVG format is converted to the raster image as per required height and width dimensions by rendering the SVG as per the required height and width dimensions.

5. The method of claim 1 further comprises scheduling reception of the offline readable document through an email.

6. A system for rendering and embedding a Scalable Vector Graphics (SVG) image in an offline readable document, the system comprising:
  a processor; and
  a memory coupled to the processor, wherein the processor is configured for executing a plurality of modules stored in the memory, and wherein the plurality of modules comprising:
    a data capturing module for receiving one or more image parameters comprising a type of an image and values corresponding to each parameter for rendering an image having a Scalable Vector Graphics (SVG) format, wherein the values are received inside a business analytical tool;
    an imaginary console module for creating an imaginary console by using a Script Engine and a Script environment, wherein the imaginary console indicates an emulated browser environment in a non-networked computer software program without a web browser and a computer console program and wherein the imaginary console is configured to simulate functionalities of a web browser for rendering, accessing, and configuring image elements corresponding to the one or more image parameters in a non-network mode;
    an SVG executor module for rendering the image having the SVG format on the imaginary console upon processing the one or more image parameters, wherein the one or more image parameters are processed by using Script Graphics Libraries (SGL), and wherein the SGL perform calculations to relate, compare the one or more image parameters, create multiple image elements, and render the image with the SVG format, the one or more image parameters, and the values; and
    a document generator module for converting the image having the SVG format into a raster image when the format of an offline readable document is an SVG incompatible format, and embedding, the image into the offline readable document.

7. The system of claim 6, wherein the image is at least one of a chart, a graph, and a map.

8. The system of claim 6, wherein the raster image format is at least one of a JPEG, a BITMAP, a PNG, and a JPG.

9. The system of claim 6, wherein the image having the SVG format is converted to the raster image as per required height and width dimensions by rendering the SVG as per the required height and width dimensions.

10. The system of claim 6 is further configured to schedule reception of the offline readable document through an email.

11. A non-transitory computer readable medium embodying a program executed in a computing device for rendering and embedding a Scalable Vector Graphics (SVG) image in an offline readable document, the program comprising:
  a program code for receiving one or more image parameters comprising a type of an image and values corresponding to each parameter for rendering an image having a Scalable Vector Graphics (SVG) format, wherein the values are received from a business analytical tool;
  a program code for creating an imaginary console by using a Script Engine and a Script environment, wherein the imaginary console indicates an emulated browser environment in a non networked computer software program without a web browser and a computer console program,. and wherein the imaginary console is configured to simulate functionalities of a web browser for rendering, accessing, and configuring image elements corresponding to the one or more image parameters in a non-network mode;
  a program code for rendering the image having the SVG format on the imaginary console upon processing the one or more image parameters, wherein the one or more image parameters are processed by using Script Graphics Libraries (SGL), and wherein the SGL perform calculations to relate, compare the one or more image parameters, create multiple image elements, and render the image with the SVG format, the one or more image parameters, and the values;

a program code for converting the image having the SVG format into a raster image when the format of an offline readable document is an SVG incompatible format; and a program code for embedding the image into the offline readable document.

* * * * *